Figure 1:
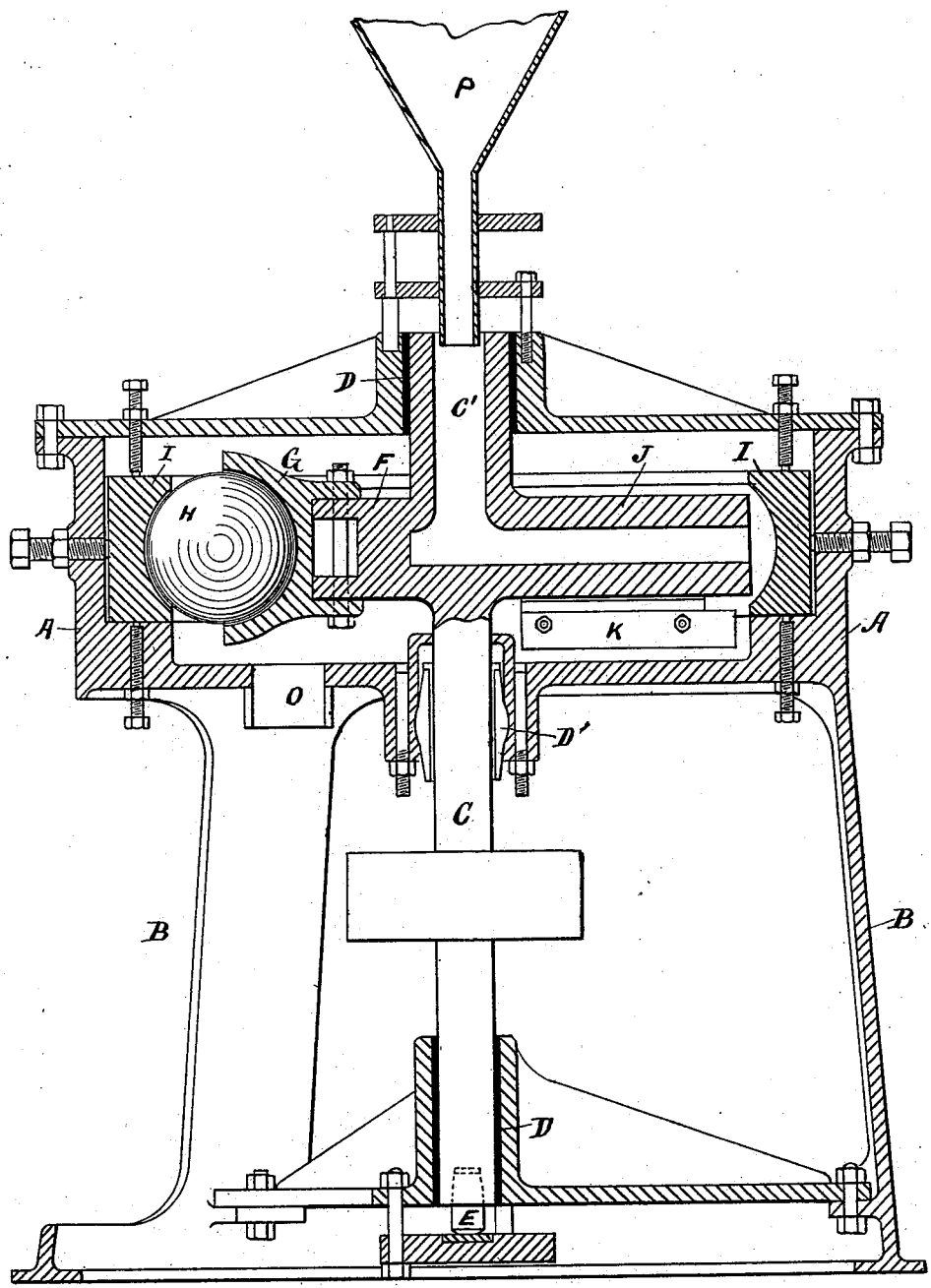
Figure 2:
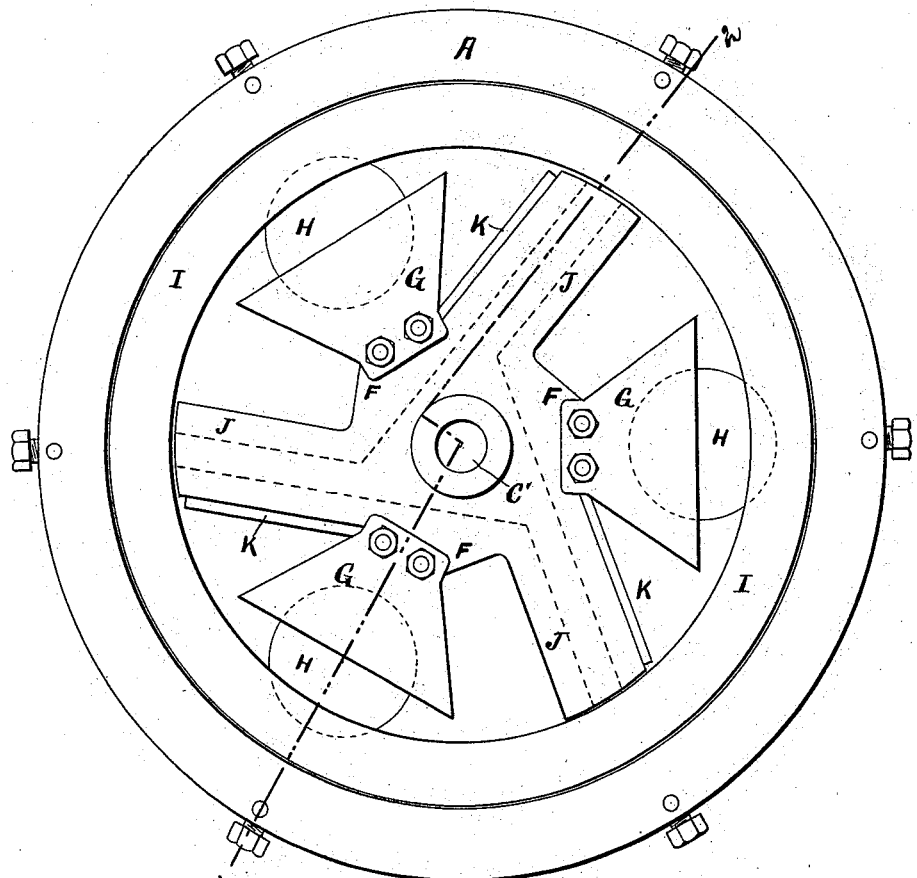
Figure 3:
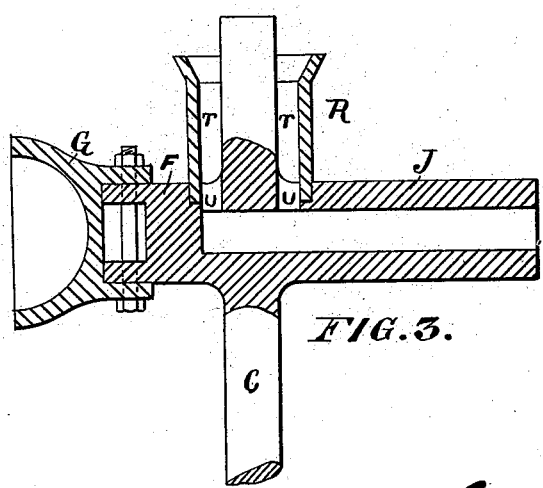
Figure 5:
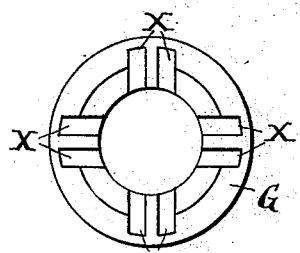
Figure 6:
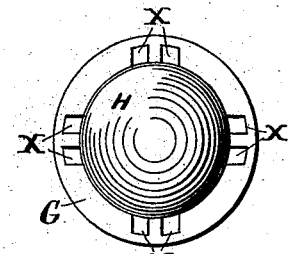
Figure 4:
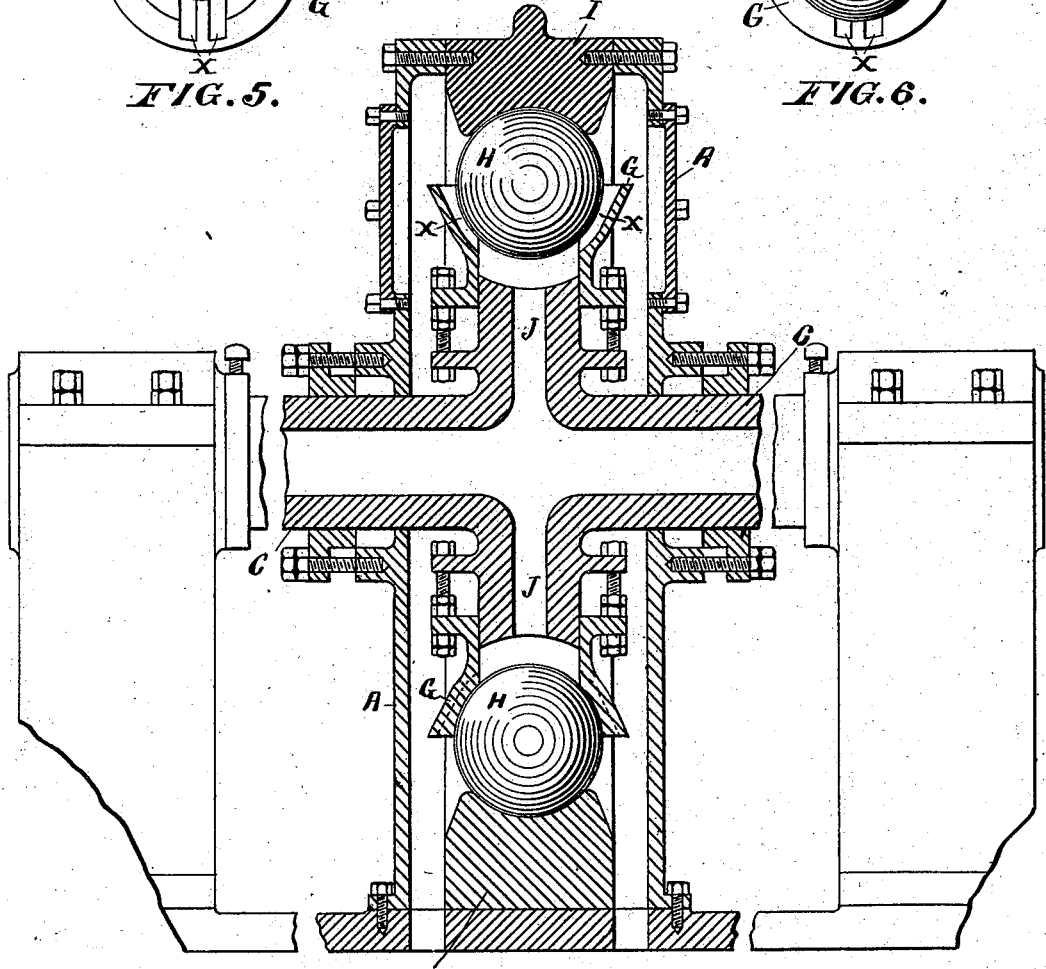

(No Model.) 3 Sheets—Sheet 2.

G. S. EMERICK.
PULVERIZING MACHINE.

No. 506,364. Patented Oct. 10, 1893.

WITNESSES: INVENTOR (No Model.) 3 Sheets—Sheet 3.

G. S. EMERICK.
PULVERIZING MACHINE.

No. 506,364. Patented Oct. 10, 1893.

WITNESSES: INVENTOR

Geo. S. Emerick.